United States Patent
Weyer et al.

(10) Patent No.: US 11,618,515 B2
(45) Date of Patent: Apr. 4, 2023

(54) SUSPENSION SYSTEM FOR A TRACK-DRIVEN WORK VEHICLE WITH TANDEM REAR IDLER/ROLLER

(71) Applicant: CNH Industrial America LLC, New Holland, PA (US)

(72) Inventors: Jason Edward Weyer, Fargo, ND (US); Brian Vik, Barnesville, MN (US); Daniel J. Zurn, Horace, ND (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 74 days.

(21) Appl. No.: 16/843,155

(22) Filed: Apr. 8, 2020

(65) Prior Publication Data
US 2020/0324836 A1  Oct. 15, 2020

Related U.S. Application Data

(60) Provisional application No. 62/831,243, filed on Apr. 9, 2019.

(51) Int. Cl.
*B62D 55/104* (2006.01)
*B62D 55/30* (2006.01)
*B62D 55/14* (2006.01)

(52) U.S. Cl.
CPC .......... *B62D 55/104* (2013.01); *B62D 55/14* (2013.01); *B62D 55/30* (2013.01)

(58) Field of Classification Search
CPC ...... B62D 55/104; B62D 55/10; B62D 55/14; B62D 55/30
See application file for complete search history.

(56) References Cited

U.S. PATENT DOCUMENTS

| | | | |
|---|---|---|---|
| 1,506,431 A | | 8/1924 | Kegresse |
| 1,513,144 A | | 10/1924 | Wellman |
| 1,980,276 A | * | 11/1934 | Kegresse ............. B62D 55/104 |
| | | | 180/9.58 |
| 2,467,947 A | | 4/1949 | Skelton |
| 2,541,943 A | | 2/1951 | Sherman |
| 3,446,302 A | | 5/1969 | Schoonover |

(Continued)

FOREIGN PATENT DOCUMENTS

| CA | 2479388 | 3/2006 |
|---|---|---|
| CN | 2395948 | 9/2000 |

(Continued)

OTHER PUBLICATIONS

US 9,783,249 B2, 10/2017, Eavenson, Sr. et al. (withdrawn)

(Continued)

*Primary Examiner* — Jacob D Knutson
*Assistant Examiner* — Abigail R Hymel
(74) *Attorney, Agent, or Firm* — Rebecca Henkel; Rickard DeMille (57) ABSTRACT

An improved suspension system for a track-driven work vehicle includes a main undercarriage support beam and a rear suspension assembly provided in operative association with the main undercarriage support beam. In one embodiment, the rear suspension assembly includes a rear rocker arm that pivotably couples both a rear idler wheel and a separate rear roller wheel of the system to the main undercarriage support beam.

12 Claims, 3 Drawing Sheets

(56) References Cited

U.S. PATENT DOCUMENTS

| | | | |
|---|---|---|---|
| 3,447,620 A | 6/1969 | Schoonover | |
| 3,504,753 A | 4/1970 | Rutley | |
| 3,603,423 A | 9/1971 | Schoonover | |
| 3,613,810 A | 10/1971 | Hetteen | |
| 3,658,145 A | 4/1972 | Bergmann et al. | |
| 3,758,169 A | 9/1973 | Trapp | |
| 3,841,424 A | 10/1974 | Purcell et al. | |
| 3,861,762 A | 1/1975 | Freedy et al. | |
| 3,915,509 A * | 10/1975 | Bell | B62D 55/30 305/147 |
| 3,938,606 A | 2/1976 | Yancey | |
| 3,938,851 A * | 2/1976 | Shelby | B62D 55/30 305/147 |
| 4,043,417 A | 8/1977 | Orpana | |
| 4,120,372 A | 10/1978 | Hartwich | |
| 4,279,318 A | 7/1981 | Meisel, Jr. | |
| 4,339,156 A * | 7/1982 | Livesay | B62D 55/14 305/125 |
| 4,351,572 A | 9/1982 | Fujiwara | |
| 4,462,480 A | 7/1984 | Yasui et al. | |
| 4,519,654 A | 5/1985 | Satzler et al. | |
| 4,582,367 A | 4/1986 | Jacquet et al. | |
| 4,647,116 A | 3/1987 | Trask | |
| 4,681,177 A | 7/1987 | Zborowski | |
| 4,708,218 A | 11/1987 | Makela | |
| 4,819,754 A | 4/1989 | Purcell et al. | |
| 4,923,527 A | 5/1990 | Ludwigson | |
| 5,031,973 A | 7/1991 | Gillet | |
| 5,293,948 A | 3/1994 | Crabb | |
| 5,316,381 A | 5/1994 | Isaacson et al. | |
| 5,409,075 A | 4/1995 | Nieman | |
| 5,452,949 A | 9/1995 | Kelderman | |
| 5,456,331 A | 10/1995 | Gustin et al. | |
| 5,566,773 A | 10/1996 | Gersmann | |
| 5,622,234 A | 4/1997 | Nagorcka et al. | |
| 5,692,579 A | 12/1997 | Peppel et al. | |
| 5,829,848 A | 11/1998 | Kelderman | |
| 5,842,757 A * | 12/1998 | Kelderman | B62D 55/14 305/125 |
| 5,873,640 A | 2/1999 | Oertley | |
| 5,899,542 A | 5/1999 | Lykken et al. | |
| 5,899,543 A | 5/1999 | Lykken et al. | |
| 5,997,109 A | 12/1999 | Kautsch | |
| 6,006,847 A | 12/1999 | Knight | |
| 6,007,166 A | 12/1999 | Tucker et al. | |
| 6,027,185 A * | 2/2000 | Crabb | B62D 55/30 305/135 |
| 6,112,840 A | 9/2000 | Forbes | |
| 6,135,220 A | 10/2000 | Gleasman et al. | |
| 6,283,562 B1 | 9/2001 | Tsubota et al. | |
| 6,302,232 B1 | 10/2001 | Forbes | |
| 6,318,484 B2 | 11/2001 | Lykken et al. | |
| 6,382,338 B1 | 5/2002 | Forbes | |
| 6,390,219 B1 | 5/2002 | Vaisanen | |
| 6,431,301 B1 | 8/2002 | Forbes | |
| 6,435,292 B2 | 8/2002 | Lemke | |
| 6,585,286 B2 | 7/2003 | Adema et al. | |
| 6,607,256 B2 | 8/2003 | Yoshida | |
| 6,615,939 B1 | 9/2003 | Karales | |
| 6,626,258 B1 | 9/2003 | Forbes | |
| 6,733,093 B2 | 5/2004 | Deland et al. | |
| 6,904,986 B2 | 6/2005 | Brazier | |
| 6,951,260 B1 | 10/2005 | Isley | |
| RE38,858 E | 11/2005 | Grawey et al. | |
| 7,131,507 B2 | 11/2006 | Wenger | |
| 7,131,508 B2 | 11/2006 | Brazier | |
| 7,296,862 B2 | 11/2007 | Albright et al. | |
| 7,380,892 B2 | 6/2008 | Rosenboom | |
| 7,478,688 B2 | 1/2009 | Ki | |
| 7,533,741 B2 | 5/2009 | Brazier | |
| 7,552,785 B2 | 6/2009 | Tuhy | |
| 7,597,161 B2 | 10/2009 | Brazier | |
| 7,628,235 B2 | 12/2009 | Satzler et al. | |
| 7,690,738 B2 | 4/2010 | Wilt | |
| 7,712,557 B2 | 5/2010 | Duceppe | |
| 7,726,749 B2 | 6/2010 | Rosenboom | |
| 7,740,084 B2 | 6/2010 | Rosenboom | |
| 7,832,508 B2 | 11/2010 | Isley | |
| 7,862,131 B2 | 1/2011 | Poirier | |
| 7,870,914 B2 | 1/2011 | Todd et al. | |
| 7,967,087 B2 | 6/2011 | Arulraja et al. | |
| 8,056,655 B2 | 11/2011 | Mallette et al. | |
| 8,118,374 B2 | 2/2012 | Canossa | |
| 8,147,007 B2 | 4/2012 | Rainer | |
| 8,157,335 B2 | 4/2012 | Poirier | |
| 8,342,257 B2 | 1/2013 | Rosenboom | |
| 8,347,991 B2 | 1/2013 | Zuchoski et al. | |
| 8,607,903 B2 | 12/2013 | Godin et al. | |
| 8,636,326 B2 | 1/2014 | Inaoka | |
| 8,708,069 B2 | 4/2014 | Allaire | |
| 8,727,047 B2 | 5/2014 | Janzen et al. | |
| 8,763,716 B2 | 7/2014 | Rosenboom | |
| 8,851,209 B2 | 10/2014 | Fukumoto | |
| 8,851,581 B2 | 10/2014 | Marchildon et al. | |
| 8,875,816 B2 | 11/2014 | Steltz et al. | |
| 8,955,925 B2 | 2/2015 | Bessette et al. | |
| 9,051,009 B2 | 6/2015 | Prohaska | |
| 9,290,216 B2 | 3/2016 | Fairhead | |
| 9,359,021 B2 | 6/2016 | Janzen et al. | |
| 9,394,015 B2 | 7/2016 | Cox | |
| 9,415,817 B2 | 8/2016 | Rackow et al. | |
| 9,415,818 B1 | 8/2016 | Tiede et al. | |
| 9,434,426 B2 | 9/2016 | Nagorcka et al. | |
| 9,440,691 B2 | 9/2016 | Rosenboom | |
| 9,457,854 B2 | 10/2016 | Van Mill et al. | |
| 9,586,642 B2 | 3/2017 | Mori | |
| 9,604,682 B2 | 3/2017 | Marchildon et al. | |
| 9,663,164 B2 | 5/2017 | Vik et al. | |
| 9,764,784 B2 | 9/2017 | Brazier | |
| 9,828,047 B2 | 11/2017 | Eavenson, Sr. et al. | |
| 9,884,662 B2 | 2/2018 | Eavenson, Sr. et al. | |
| 9,937,969 B2 | 4/2018 | Obermeier-Hartmann et al. | |
| 9,950,756 B2 | 4/2018 | De Boe et al. | |
| 9,963,177 B2 | 5/2018 | Marchildon et al. | |
| 9,994,268 B2 | 6/2018 | Gustafson | |
| 10,035,551 B2 | 7/2018 | Davis et al. | |
| 10,059,391 B2 | 8/2018 | Kirchmair et al. | |
| 10,065,690 B2 | 9/2018 | Summer et al. | |
| 10,099,733 B1 * | 10/2018 | Sewell | B62D 55/22 |
| 10,308,296 B2 | 6/2019 | Piens et al. | |
| 10,597,098 B2 | 3/2020 | Vik et al. | |
| 2001/0030068 A1 | 10/2001 | Nagorkca et al. | |
| 2004/0119336 A1 | 6/2004 | Lussier | |
| 2005/0046277 A1 | 3/2005 | Simons et al. | |
| 2006/0254832 A1 | 11/2006 | Strong | |
| 2007/0029871 A1 * | 2/2007 | Wake | B62D 55/244 301/124.1 |
| 2008/0156548 A1 | 7/2008 | Mallette et al. | |
| 2008/0196947 A1 * | 8/2008 | Brazier | B62D 21/183 180/9.5 |
| 2010/0059297 A1 | 3/2010 | Urbanik et al. | |
| 2010/0237574 A1 | 9/2010 | Allaire | |
| 2011/0309672 A1 | 12/2011 | Thorson | |
| 2012/0090903 A1 | 4/2012 | Bessette et al. | |
| 2012/0125701 A1 * | 5/2012 | Brazier | B60G 21/04 180/9.5 |
| 2013/0092458 A1 * | 4/2013 | Fairhead | B62D 51/04 180/6.7 |
| 2013/0119753 A1 * | 5/2013 | Pare | B62D 55/065 305/128 |
| 2013/0154345 A1 | 6/2013 | Schulz et al. | |
| 2015/0217816 A1 | 8/2015 | Franck | |
| 2015/0321711 A1 | 11/2015 | Vik | |
| 2015/0329154 A1 | 11/2015 | Roy | |
| 2016/0159414 A1 * | 6/2016 | Hansen | B62D 55/084 305/185 |
| 2016/0194038 A1 | 7/2016 | Jean | |
| 2016/0355221 A1 | 12/2016 | Van Mill et al. | |
| 2016/0362150 A1 | 12/2016 | Kirchmair et al. | |
| 2017/0036714 A1 | 2/2017 | Lunkenbein | |
| 2017/0210436 A1 * | 7/2017 | Brazier | B62D 55/08 |
| 2017/0225727 A1 * | 8/2017 | Sauvageau | B62D 55/096 |
| 2017/0291652 A1 | 10/2017 | Marchildon et al. | |

(56) References Cited

U.S. PATENT DOCUMENTS

| | | | |
|---|---|---|---|
| 2018/0009490 A1 | 1/2018 | Sauvageau et al. | |
| 2018/0022408 A1 | 1/2018 | Sauvageau et al. | |
| 2018/0043948 A1* | 2/2018 | Johnson | B62D 55/10 |
| 2018/0086397 A1 | 3/2018 | Sauvageau et al. | |
| 2018/0118291 A1 | 5/2018 | Sauvageau et al. | |
| 2018/0162464 A1 | 6/2018 | Eavenson et al. | |
| 2018/0162465 A1 | 6/2018 | Visscher et al. | |

FOREIGN PATENT DOCUMENTS

| | | |
|---|---|---|
| CN | 2752135 | 1/2006 |
| CN | 101138992 B | 10/2013 |
| CN | 203681264 U | 7/2014 |
| CN | 104691633 A | 6/2015 |
| CN | 204567824 U | 8/2015 |
| CN | 106494521 A | 3/2017 |
| CN | 103770634 B | 6/2017 |
| CN | 107531294 A | 1/2018 |
| DE | 2949942 | 12/1979 |
| DE | 19919959 | 11/2000 |
| DE | 202004020124 U1 | 4/2005 |
| DE | 202010009744 U1 | 11/2010 |
| EP | 2574526 A2 | 4/2013 |
| GB | 2301569 B | 5/1999 |
| JP | H09240526 | 9/1997 |
| JP | H09267779 | 10/1997 |
| JP | 2000006857 | 1/2000 |
| JP | 2010052549 | 3/2010 |
| RU | 2446974 C2 | 4/2012 |
| SU | 1691210 | 11/1991 |
| WO | WO1997/036778 | 10/1997 |
| WO | WO2014/022042 | 2/2014 |
| WO | WO2014/022043 | 2/2014 |
| WO | WO2016/080577 | 5/2016 |
| WO | WO2017/078980 | 5/2017 |
| WO | WO2018/024762 | 2/2018 |
| WO | WO2018/024766 | 2/2018 |

OTHER PUBLICATIONS

Peter Hill, "Soft-Shoe Shuffle." iVT International Industrial Vehicle Technology Magazine, Jun./Jul. 2011, p. 26-30.
Peter Hill, "Wheels vs. Tracks." iVT International Industrial Vehicle Technology Magazine, May/Jun. 2008. p. 32-38.
Track Suspension, ScoutBot 1402 (an Outdoor Robot), Let's Make Robots! RobotShop, dated May 15, 2012, retrieved Aug. 31, 2018 (pp. 1-10) https://www.robotshop.com/letsmakerobots/scoutbot-1402-outdoor-robot?page=1.

* cited by examiner

SUSPENSION SYSTEM FOR A TRACK-DRIVEN WORK VEHICLE WITH TANDEM REAR IDLER/ROLLER

CROSS-REFERENCE TO RELATED APPLICATIONS

The present application is based upon and claims the right of priority to U.S. Provisional Patent Application No. 62/831,243, filed Apr. 9, 2019, the disclosure of which is hereby incorporated by reference herein in its entirety for all purposes.

FIELD OF THE INVENTION

The present subject matter relates generally to track-driven work vehicles and, more particularly, to a suspension system for a track assembly of a track-driven work vehicle that includes a rear rocker beam for suspending both a rear idler wheel and a rear roller of the track assembly in tandem relative to a main undercarriage support beam of the suspension system.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For instance, for a four-wheel drive track-driven vehicle, a drive wheel of each front track assembly is typically rotationally coupled to a front axle assembly of the work vehicle for transferring torque transmitted from the engine to the front track assembly, while a drive wheel of each rear track assembly is typically rotationally coupled to a rear axle assembly of the work vehicle for transferring torque transmitted from the engine to the rear track assembly. As is generally understood, each drive wheel may be configured to rotationally engage a corresponding endless track of the associated track assembly such that rotation of the drive wheel rotates the track, thereby allowing the vehicle to be driven forward or backward.

Each track assembly is typically associated with a suspension system having one or more undercarriage support beams. The undercarriage support beam(s) is used to support the vehicle above various load bearing wheels (e.g., roller wheels), which roll on the endless track as the work vehicle traverses a field or other driving surface. For most suspension systems, it is desirable to distribute the weight of the work vehicle across the load bearing wheels to reduce the stresses acting on the track that may otherwise decrease track longevity due to overheating or other weight overload issues, as well as to maintain the endless track in contact with the ground. To allow for such weight distribution across the load bearing wheels, systems must be developed that are designed to dampen movement of one or more system components relative to the other components of the suspension system. Such motion damping not only allows for more even weight distribution and improved track-to-ground contact, but also limits the amount of vibrations transmitted between the track assembly and the vehicle's chassis, thereby increasing the smoothness of the ride and, thus, the operator's comfort level.

To date, various suspension systems have been developed for track assemblies that attempt to provide desired track performance. However, such conventional suspension systems still lack the capability of providing the desired amount of motion damping between the various track components, particularly sufficient vertical damping to accommodate large bumps and/or other significant variations in the ground surface profile Accordingly, an improved suspension system for use with a track assembly of a track-driven work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a suspension system configured in accordance with one or more embodiments disclosed herein.

In another aspect, the present subject matter is directed to a suspension system for a track assembly of a track driven work vehicle. The suspension system includes a main undercarriage support beam, and front and rear idler wheels coupled to opposed ends of the main undercarriage support beam, with the rear idler wheel being pivotably coupled to the main undercarriage support beam via a rocker beam. The system also includes a separate roller wheel supported relative to the main undercarriage support beam via the rocker beam. The rocker beam is coupled at one end to the rear idler wheel and at an opposed end to the roller wheel.

In a further aspect, the present subject matter is directed to a track assembly for a track-driven work vehicle. The track assembly includes a track, a drive wheel configured to engage the track, front and rear idler wheels around which the track is wrapped, and a plurality of roller wheels positioned between the front and rear idler wheels, with the plurality of roller wheels including a rearward-most roller wheel and at least one additional roller wheel. The track assembly further including a main undercarriage support beam relative to which the front and rear idler wheels and the plurality of roller wheels are suspended. Additionally, the rear idler wheel and the rearward-most roller wheel are suspended relative to the main undercarriage support beam via a rocker beam.

In yet another aspect, the present subject matter is directed to a track-driven work vehicle including a chassis and a track assembly supported relative to the chassis. The track assembly includes a track, a drive wheel configured to engage the track, a main undercarriage support beam coupled to the chassis, as well as a front idler suspension assembly, a roller suspension assembly, and a rear suspension assemblies provided in operative association with the main undercarriage support beam. The front idler suspension assembly includes a front idler wheel and a pivot beam coupled between the main undercarriage support beam and the front idler wheel. The roller suspension assembly includes at least one roller wheel and a roller beam configured to support the at least one roller wheel. The rear suspension assembly includes a rear idler wheel, a rear roller wheel positioned rearward of the at least one roller wheel, and a rocker beam pivotably coupling the rear idler wheel and the rear roller wheel to the main undercarriage support beam.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved suspension system for a track-driven work vehicle. Specifically, the suspension system includes a rear suspension assembly that allows for a rear idler wheel and a rear roller wheel of the system to be suspended in tandem, thereby providing improved vertical motion damping to accommodate bumps and other ground contour changes, particularly along the along the rear side or portion of the track assembly.

In several embodiments, the rear suspension assembly includes a rear walking or rocker beam that pivotably couples both the rear idler wheel and the adjacent rear roller wheel to a main undercarriage support beam of the suspension system. As such, the rear rocker beam may function to suspend both the rear idler wheel and the rear roller wheel relative to the main undercarriage support beam. For example, the rear rocker beam may extend lengthwise between opposed forward and rear ends, with an intermediate span of the rocker beam extending between its forward and rear ends. In such an embodiment, the rear rocker beam may be coupled to the rear idler wheel at or adjacent to its rear end and to the rear roller wheel at or adjacent to its forward end, with the main undercarriage support beam being pivotably coupled to the rear rocker beam at a central pivot point defined between the forward and rear ends of the rocker beam.

It should be appreciated that the disclosed suspension system provides enhanced motion damping over conventional suspension systems, which can lead to more even weight distribution, better track-to-ground contact, and improved operator comfort. For example, the disclosed system may allow for the independent suspension of the rear idler wheel and the adjacent rear roller wheel relative to the main undercarriage support beam, thereby providing improved vertical compliance to accommodate large bumps and/or other significant variations the ground surface profile along the rear side or portion of the track assembly. Given that the rearward-most wheels of the suspension system are typically the highest contributor or source of vibrations transmitted from the track assembly to the operator's cab, the present subject matter may greatly improve operator comfort and the overall smoothness of the ride.

Figure 1:
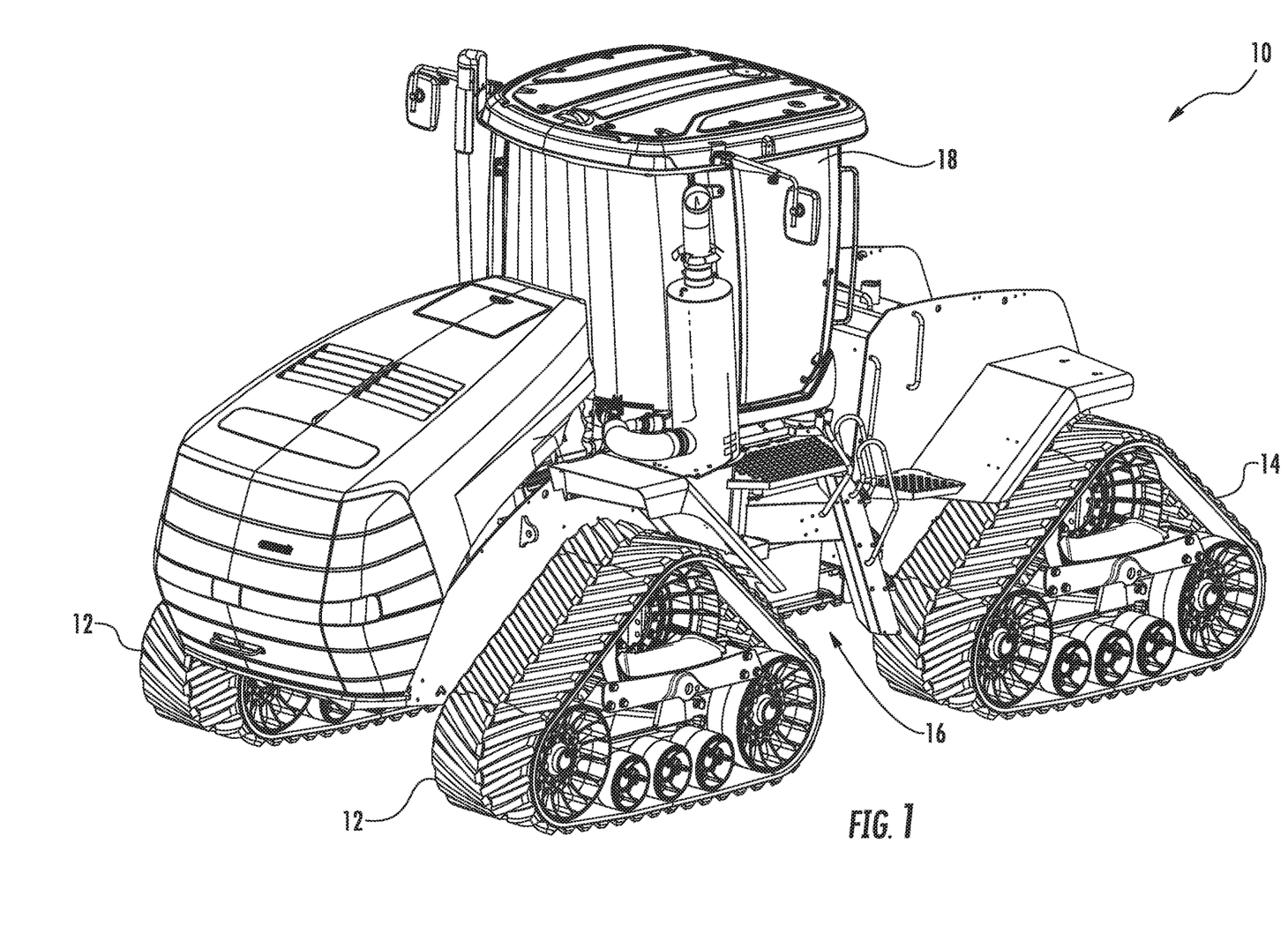
FIG. 1 illustrates a perspective view of one embodiment of a track-driven work vehicle in accordance with aspects of the present subject matter.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Figure 2:
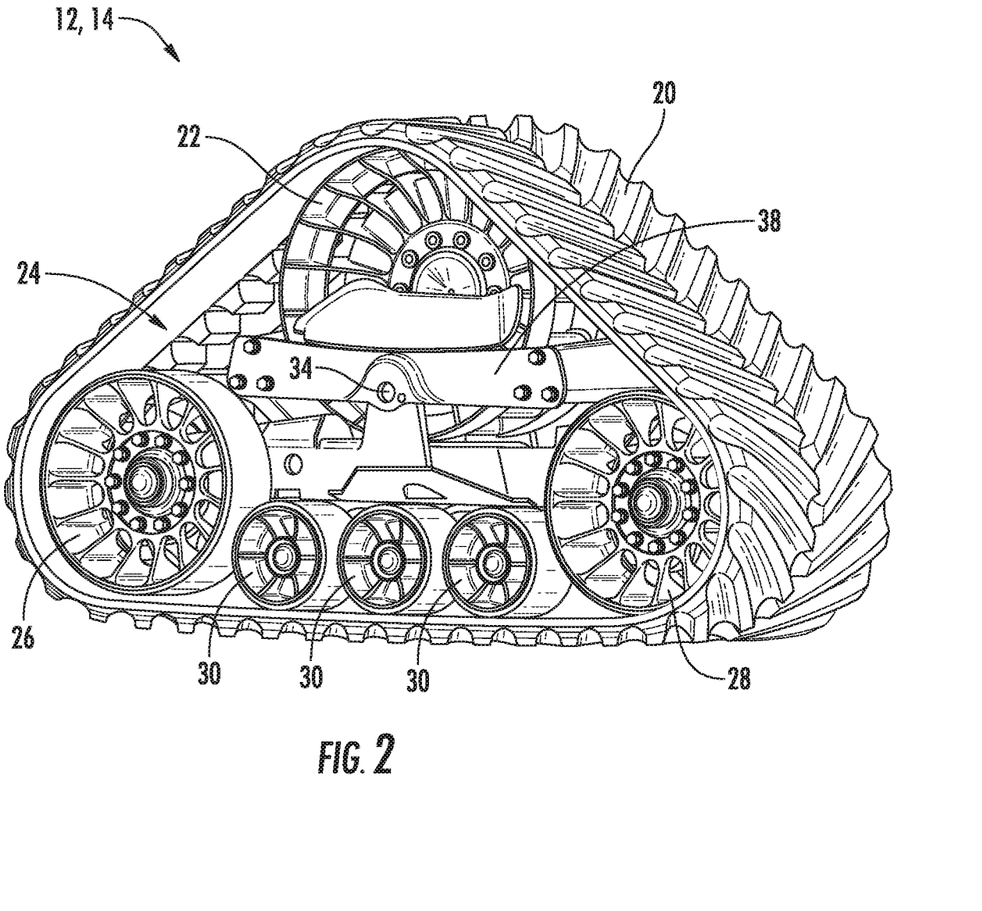
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the front track assemblies 12, 14 shown in FIG. 1 is illustrated in accordance with aspects of the present subject matter. As shown, the track assembly 12, 14 may generally include a track 20, a drive wheel 22 for mechanically engaging the track 20, and a suspension system 24 for supporting the weight of the work vehicle 10 and for damping vibrations and other movement between the track 20 and the vehicle's chassis 16. In one embodiment, the suspension system 24 may include front and rear idler wheels 26, 28 about which the track 20 is wrapped and a plurality of roller wheels 30 for guiding the track 20 between the idler wheels 26, 28. Additionally, the suspension system 24 may include one or more undercarriage support beams (not shown in FIG. 2) configured to support the idler wheels 26, 28 and the roller wheels 30 relative to the track 20.

In one embodiment, one or more components of the suspension system 24 may be pivotally supported on the vehicle chassis 16 (FIG. 1) by two pivot pins, namely an outboard pivot pin 34 and an inboard pivot pin (not shown)). The outboard pivot pin 34 is located outboard of the drive wheel 22 while the inboard pivot pin is located inboard of the drive wheel 22 and is secured on the vehicle chassis 16. In one embodiment, the outboard pivot pin 34 may be configured to be coupled between an undercarriage bearing support member 38 and one or more of the undercarriage support beams of the suspension system 24. For example, the pivot pin 34 may be configured to be received through both the bearing support member 38 and a portion of the adjacent undercarriage support beam(s). The bearing support member 38 may, in turn, be secured at each of its ends to support posts (not shown) coupled to the vehicle chassis 16. As such, the outboard pivot pin 34 may serve to pivotally couple the undercarriage support beam(s) to the chassis 16.

It should be appreciated that a similar pivotal support arrangement may also be provided on the vehicle chassis 16 inboard of the drive wheel 22 utilizing the inboard pivot pin. For example, the inboard pivot pin may be configured to be received within a suitable opening defined in the adjacent undercarriage support beam(s) for pivotally coupling the support beam(s) to the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration.

Figure 3:
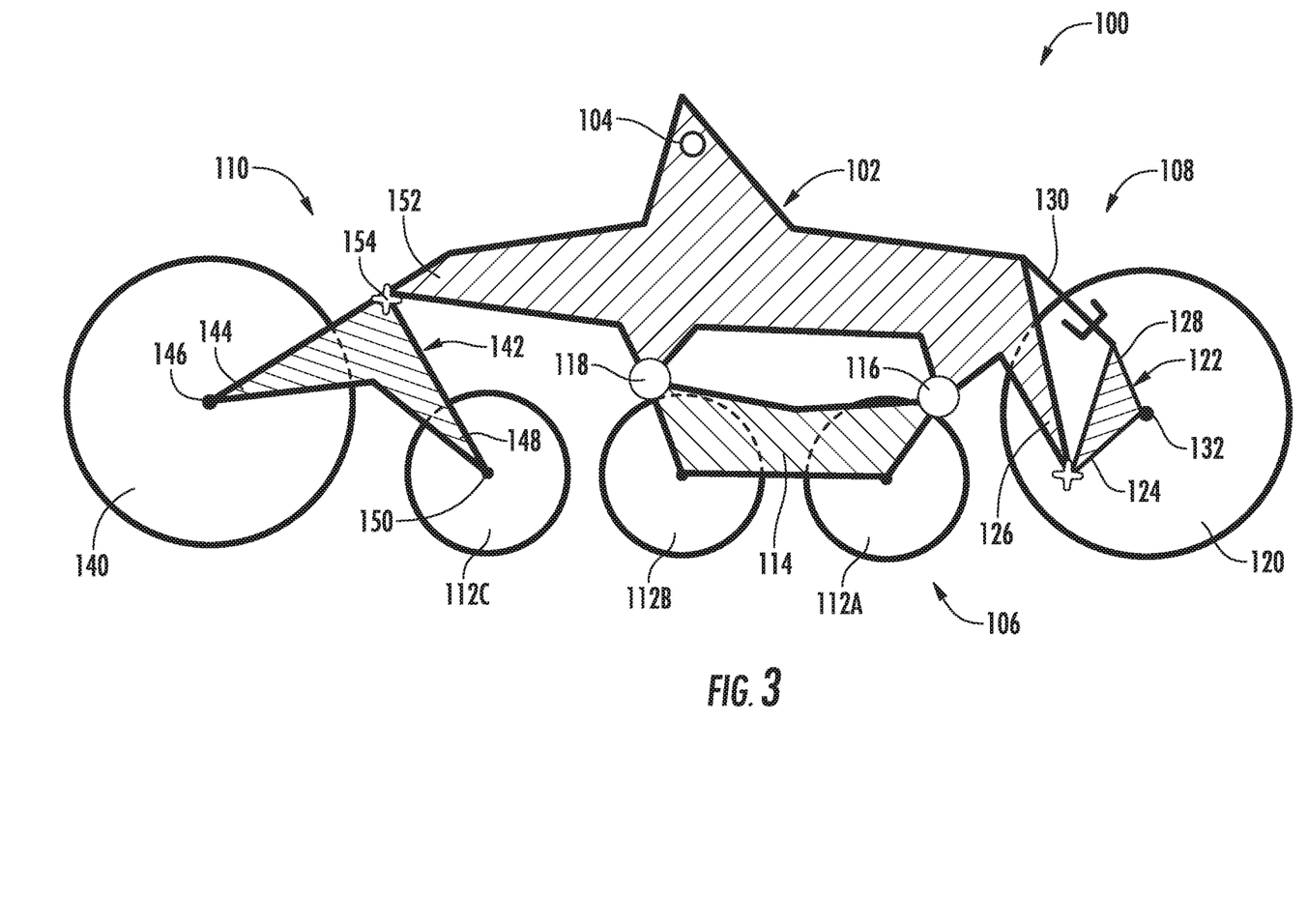
FIG. 3 illustrates a schematic, simplified view of one embodiment of a suspension system suitable for use with a track assembly for a track-driven work vehicle in accordance with aspects of the present subject matter.

Referring now to FIG. 3, a schematic, simplified view of one embodiment of a suspension system 100 suitable for use with a track assembly for a track-driven work vehicle is illustrated in accordance with aspects of the present subject matter. For instance, the illustrated suspension system 100 may, for example, correspond to or form a replacement for the suspension system 24 described above with reference to the track assembly 12, 14 of FIG. 2.

In several embodiments, the suspension system 100 includes a main undercarriage support beam 102. In one embodiment, the main undercarriage support beam 102 may be configured to be pivotably coupled to the chassis of an associated vehicle. For instance, the main undercarriage support beam 102 may define openings 104 (e.g., outboard and inboard openings) for receiving suitable pivot pins for coupling the beam 102 to the vehicle's chassis, such as by using the pivot pins described above with reference to FIG. 2. Additionally, in accordance with aspects of the present subject matter, the suspension system 100 includes a roller suspension assembly 106, a front idler suspension assembly 108, and a rear suspension assembly 110 coupled to or otherwise provided in operative association with the main undercarriage support beam 102.

As shown in FIG. 3, the roller suspension assembly 106 includes a plurality of roller wheels 112 (e.g., a front roller 112A and a central or intermediate roller 112B), which may, for example, be configured the same as or similar to the roller wheels 30 described above with reference to FIG. 2. As will be described below, the rearward-most roller wheel (e.g., rear roller 112C) may be isolated from the remainder of the other roller wheels 112A, 112B and may form part of the rear suspension assembly 110. The roller suspension assembly 106 also includes one or more roller suspension beams configured to rotationally support the adjacent roller wheels 112A, 112B. For instance, in the illustrated embodiment, the roller suspension assembly 106 includes a single roller beam 114 configured to support the roller wheels 112A, 112B relative to the main undercarriage support beam 102. However, in other embodiments, the roller suspension assembly 106 may include two or more roller suspension beams for suspending the roller wheels 112A, 112B relative to the main undercarriage support beam 102.

In one embodiment, the roller beam 114 may be coupled or suspended relative to the main undercarriage support beam 102 via one or more suspension elements of the roller suspension assembly 106. For instance, as schematically shown in FIG. 3, the roller beam 114 may be suspended relative to the main undercarriage support beam 102 via first and second suspension elements 116, 118 coupled between the opposed ends of the roller beam 114 and the main undercarriage support beam 102. The suspension elements 116, 118 may, for instance, correspond to any suitable damping elements, such as rubber dampers, springs, and/or the like.

It should be appreciated that, in other embodiments, the roller suspension assembly 106 may have any other suitable configuration that allows for the disclosed system 100 to generally function as described herein. For instance, another example of a suitable configuration for the roller suspension system 106 is described in International Patent Application No. PCT/EP2019/054038, filed on Feb. 19, 2019 with a priority date of Feb. 22, 2018 and entitled "Suspension System for a Track Band Transmission," the disclosure of which is hereby incorporated by reference herein in its entirety for all purposes.

As shown in FIG. 3, the front idler suspension assembly 108 of the disclosed system 100 may include a front idler wheel 120, which may, for example, be configured the same as or similar to the front idler wheel 26 described above with reference to FIG. 2. In addition, the front idler suspension assembly 108 includes a front pivot beam 122 configured to pivotably couple the front idler wheel 120 to the main undercarriage support beam 102. Specifically, as shown in the illustrated embodiment, one end of the front pivot beam 122 (e.g., a first end 124) is pivotably coupled to a forward end 126 of the main undercarriage support beam 102, while an opposed end of the front pivot beam 122 (e.g., a second end 128) is pivotably coupled to a pre-loading or tensioning element of the suspension system 100 (e.g., a tensioning cylinder 130). In such an embodiment, as shown in FIG. 3, a central or intermediate portion of the front pivot beam 122 defined between its opposed ends 124, 128 may be configured to be coupled to the front idler wheel 120 (e.g., at a rotational axis 132 of the idler wheel 120). It should be appreciated that the tensioning cylinder 130 may be coupled between the front pivot arm 122 and a portion of the main undercarriage support beam 102 to allow the pre-load or tension within the track to be increased or decreased by moving the front idler wheel 120 further away from or closer to, respectively, a rear idler wheel 140 (described below) of the system 100.

As indicated above, the disclosed system 100 further includes a rear suspension assembly 110. As shown in FIG. 3, the rear suspension assembly 110 includes both the rearward-most roller wheel (e.g., rear roller 112C) and a rear idler wheel 140, which may, for example, be configured the same as or similar to the rear idler wheel 28 described above with reference to FIG. 2. In addition, the rear suspension assembly 110 includes a rear walking or rocker beam 142 configured to pivotably couple the rear roller 112C and the rear idler wheel 140 to the main undercarriage support beam 102.

Specifically, as shown in FIG. 3, one end of the rear rocker beam 142 (e.g., a rear end 144) is coupled to the rear idler wheel 140 (e.g., at or adjacent to its rotational axis 146) while an opposed end of the rear rocker beam 142 (e.g., a forward end 148) is pivotably coupled to the rear roller 112C (e.g., at or adjacent to its rotational axis 150). Additionally, as shown in FIG. 3, a central or intermediate portion of the rear rocker beam 142 defined between its opposed ends 144, 148 is pivotably coupled to the main undercarriage support beam 102 (e.g., at a rear end 152 of the support beam 102), thereby providing a pivot point 154 about which the rocker beam 142 is configured to pivot relative to the main undercarriage support beam 102.

As a result of the above-described configuration of the rear suspension assembly 110, loads may be transferred between the rear idler wheel 140 and the rear roller 112C as such wheels 140, 112C are displaced vertically when passing over a bump or other variation in the ground surface contour. For example, as the rear idler wheel 140 pivots upwardly relative to the main undercarriage support beam 102 about the pivot point 154, the opposed end 148 of the rear rocker beam 142 may be forced downwardly, thereby increasing the ground force applied by the rear roller wheel 112C. Similarly, as the rear roller 112C is displaced upwardly, the corresponding upward pivoting movement of the adjacent end 148 of the rear rocker beam 142 results in the opposed end 144 of the rear rocker beam 142 being forced downwardly, thereby increasing the ground force applied by the rear idler wheel 140.

It should be appreciated that the specific location or relative positioning of the pivot point 154 about which the rear rocker beam 142 pivots relative to the main undercarriage support beam 102 may be selected to ensure that the rear suspension assembly 110 generally functions as described herein. For instance, in one embodiment, the pivot point 154 may, for example, be disposed at a location that is in-line with or offset from the bi-sector of the track forces on the front and rear idler wheels 120, 140. Additionally, in one embodiment, the relative positioning of the pivot point 154 may be selected such that the force of the rear idler wheel 140 on the ground is lower than the force applied on the rear roller wheel 112C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A suspension system for a track assembly of a track-driven work vehicle, the suspension system comprising:
a main undercarriage support beam;
front and rear idler wheels coupled to opposed ends of the main undercarriage support beam, the front idler wheel being coupled to the main undercarriage support beam via a pivot beam, the rear idler wheel being pivotably coupled to the main undercarriage support beam via a rocker beam;
a tensioning element coupled between the main undercarriage support beam and the pivot beam;
a separate roller wheel supported relative to the main undercarriage support beam via the rocker beam; and
at least one additional roller wheel supported relative to the main undercarriage support beam via a roller suspension beam, the roller suspension beam being separate from the pivot beam and the rocker beam, the roller suspension beam being coupled to the main undercarriage support beam independently of the pivot beam and the rocker beam via at least one suspension element such that the at least one additional roller wheel is moveable relative to the main undercarriage support beam independently of the separate roller wheel and the front idler wheel,
wherein the rocker beam is coupled at a first end to the rear idler wheel and at an opposed second end to the separate roller wheel, and
wherein one end of the pivot beam is pivotably coupled to the main undercarriage support beam, an opposed end of the pivot beam is pivotably coupled to the tensioning element, and a central portion of the pivot beam positioned between the one end of the pivot beam and the opposed end of the pivot beam is coupled to the front idler wheel.

2. The suspension system of claim 1, wherein the first end comprises a rear end of the rocker beam and the second end comprises a forward end of the rocker beam.

3. The suspension system of claim 2, wherein the rocker beam includes an intermediate portion extending between the rear end and the forward end of the rocker beam, the intermediate portion of the rocker beam being pivotably coupled to the main undercarriage support beam.

4. The suspension system of claim 1, wherein the rocker beam is pivotably coupled to the main undercarriage support beam at a pivot point defined between the opposed ends of the rocker beam such that the rear idler wheel pivots downwardly relative to the main undercarriage support beam with upward pivoting movement of the separate roller wheel relative to the main undercarriage support beam.

5. The suspension system of claim 1, wherein the separate roller wheel comprises a rearward-most roller wheel.

6. A track assembly for a track-driven work vehicle, the track assembly comprising:
a track;
a drive wheel configured to engage the track;
front and rear idler wheels around which the track is wrapped;
a plurality of roller wheels positioned between the front and rear idler wheels, the plurality of roller wheels including a rearward-most roller wheel and at least one additional roller wheel; and
a main undercarriage support beam relative to which the front and rear idler wheels and the plurality of roller wheels are suspended;
wherein the front idler wheel is coupled to the main undercarriage support beam via a pivot beam,
wherein the rear idler wheel and the rearward-most roller wheel are suspended relative to the main undercarriage support beam via a rocker beam,
wherein the at least one additional roller wheel is supported relative to the main undercarriage support beam via a roller suspension beam, the roller suspension beam being separate from the pivot beam and the rocker beam, the roller suspension beam being coupled to the main undercarriage support beam independently of the pivot beam and the rocker beam via at least one suspension element such that the at least one additional roller wheel is moveable relative to the main undercarriage support beam independently of the rearward-most roller wheel and the front idler wheel; and
wherein one end of the pivot beam is pivotably coupled to the main undercarriage support beam, an opposed end of the pivot beam is pivotably coupled to a tensioning element coupled between the main undercarriage support beam and the pivot beam, and a central portion of the pivot beam positioned between the one end of the pivot beam and the opposed end of the pivot beam is coupled to the front idler wheel.

7. The track assembly of claim 6, wherein the rocker beam is coupled at a first end to the rear idler wheel and at an opposed second end to the rearward-most roller wheel.

8. The track assembly of claim 7, wherein the rocker beam includes an intermediate portion extending between the first and second ends of the rocker beam, the intermediate portion of the rocker beam being pivotably coupled to the main undercarriage support beam.

9. The track assembly of claim 7, wherein the rocker beam is pivotably coupled to the main undercarriage support beam at a pivot point defined between the first and second ends of the rocker beam such that the rear idler wheel pivots downwardly relative to the main undercarriage support beam with upward pivoting movement of the rearward-most roller wheel relative to the main undercarriage support beam.

10. A track-driven work vehicle, comprising:
a chassis; and
a track assembly supported relative to the chassis, the track assembly comprising:
  a track;
  a drive wheel configured to engage the track;
  a main undercarriage support beam coupled to the chassis;
  a front idler suspension assembly provided in operative association with the main undercarriage support beam, the front idler suspension assembly comprising:
    a front idler wheel; and
    a pivot beam coupled between the main undercarriage support beam and the front idler wheel; and
    a tensioning element coupled between the main undercarriage support beam and the pivot beam;
  a roller suspension assembly provided in operative association with the main undercarriage support beam, the roller suspension assembly comprising:
    at least one roller wheel; and
    a roller beam configured to support the at least one roller wheel;
  a rear suspension assembly provided in operative association with the main undercarriage support beam, the rear suspension assembly comprising:
    a rear idler wheel;
    a rear roller wheel positioned rearward of the at least one roller wheel; and
    a rocker beam pivotably coupling the rear idler wheel and the rear roller wheel to the main undercarriage support beam,
  wherein the roller beam is separate from the pivot beam and the rocker beam, and
  wherein the roller beam being coupled to the main undercarriage support beam independently of the pivot beam and the rocker beam via at least one suspension element such that the at least one roller wheel is moveable relative to the main undercarriage support beam independently of the rear roller wheel and the front idler wheel; and
  wherein one end of the pivot beam is pivotably coupled to the main undercarriage support beam, an opposed end of the pivot beam is pivotably coupled to the tensioning element, and a central portion of the pivot beam positioned between the one end of the pivot beam and the opposed end of the pivot beam is coupled to the front idler wheel.

11. The work vehicle of claim 10, wherein the rocker beam is coupled at a first end to the rear idler wheel and at an opposed second end to the rear roller wheel, and
wherein the rocker beam includes an intermediate portion extending between the first and second ends of the rocker beam, the intermediate portion of the rocker beam being pivotably coupled to the main undercarriage support beam.

12. The work vehicle of claim 11, wherein the rocker beam is pivotably coupled to the main undercarriage support beam at a pivot point defined between the first and second ends of the rocker beam such that the rear idler wheel pivots downwardly relative to the main undercarriage support beam with upward pivoting movement of the rear roller wheel relative to the main undercarriage support beam.

\* \* \* \* \*